US012695385B2

(12) United States Patent
Guo et al.

(10) Patent No.:　US 12,695,385 B2
(45) Date of Patent:　　Jul. 28, 2026

(54) SWITCH CONTROL CIRCUIT, ELECTRONIC DEVICE AND SWITCH CONTROL METHOD

(71) Applicant: GUANGDONG OPPO MOBILE TELECOMMUNICATIONS CORP., LTD., Dongguan (CN)

(72) Inventors: Hongguang Guo, Dongguan (CN); Chensong Zhang, Dongguan (CN); Chen Tian, Dongguan (CN); Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 457 days.

(21) Appl. No.: 18/376,246

(22) Filed: Oct. 3, 2023

(65) Prior Publication Data

US 2024/0030819 A1　　Jan. 25, 2024

Related U.S. Application Data

(63) Continuation of application No. PCT/CN2022/083653, filed on Mar. 29, 2022.

(30) Foreign Application Priority Data

May 7, 2021　(CN) .......................... 202110497098.6

(51) Int. Cl.
　　H02M 3/158　　(2006.01)
　　H02M 1/00　　(2007.01)
(52) U.S. Cl.
　　CPC ....... H02M 3/1582 (2013.01); H02M 1/0006 (2021.05)

(58) Field of Classification Search
　　CPC .......................... H02M 1/0006; H02M 3/1582
　　See application file for complete search history.

(56) References Cited

U.S. PATENT DOCUMENTS

2018/0287496 A1　10/2018　Bayer et al.
2020/0373841 A1 *　11/2020　Xie ..................... H02M 3/1582

FOREIGN PATENT DOCUMENTS

CN　　　102055335 A　　5/2011
CN　　　102857096 A　　1/2013
(Continued)

OTHER PUBLICATIONS

Chun et al, "Micro Gas Turbine Power Generation Technology", vol. 4-9, 17-18; Machinery Industry Press, Aug. 31, 2012.
(Continued)

*Primary Examiner* — Jue Zhang
(74) *Attorney, Agent, or Firm* — Sheppard, Mullin, Richter & Hampton LLP

(57)　　ABSTRACT

Provided are a switch control circuit and method, and an electronic device. The switch control circuit includes a voltage conversion module and a control module. The voltage conversion module operates, based on a received input voltage, in at least one of a boost mode, a buck mode and a buck-boost mode. The control module controls switching frequencies of first, second, third and fourth switches of the voltage conversion module. In the boost mode, the first and third switches are switched, at a first switching frequency, between an on-state and an off-state, and the second and fourth switches are switched, at a second switching frequency larger than the first switching frequency, between the on-state and the off-state. In the buck mode, each of the first and third switches is switched at the second switching frequency, and each of the second and fourth switches is switched at the first switching frequency.

20 Claims, 6 Drawing Sheets

(56)                    References Cited

FOREIGN PATENT DOCUMENTS

| | | | |
|---|---|---|---|
| CN | 106849659 | A | 6/2017 |
| CN | 109792209 | A | 5/2019 |
| CN | 110323944 | A | 10/2019 |
| CN | 110460233 | A | 11/2019 |
| CN | 111030463 | A | 4/2020 |
| CN | 111092549 | A | 5/2020 |
| CN | 211557152 | U | 9/2020 |
| CN | 112290854 | A | 1/2021 |
| CN | 112072916 | B | 2/2021 |
| WO | WO-2015008456 | A1 * | 1/2015 .......... H02M 3/1582 |

OTHER PUBLICATIONS

CNIPA, First Office Action for CN Application No. 202110497098.6 mailed on Mar. 31, 2025.

WIPO, International Search Report for PCT Application No. PCT/CN2022/083653, Jun. 14, 2022.

CNIPA, Second Office Action for CN Application No. 202110497098. 6, Jul. 16, 2025.

CNIPA, Decision of Rejection for CN Application No. 202110497098. 6, Sep. 11, 2025.

* cited by examiner

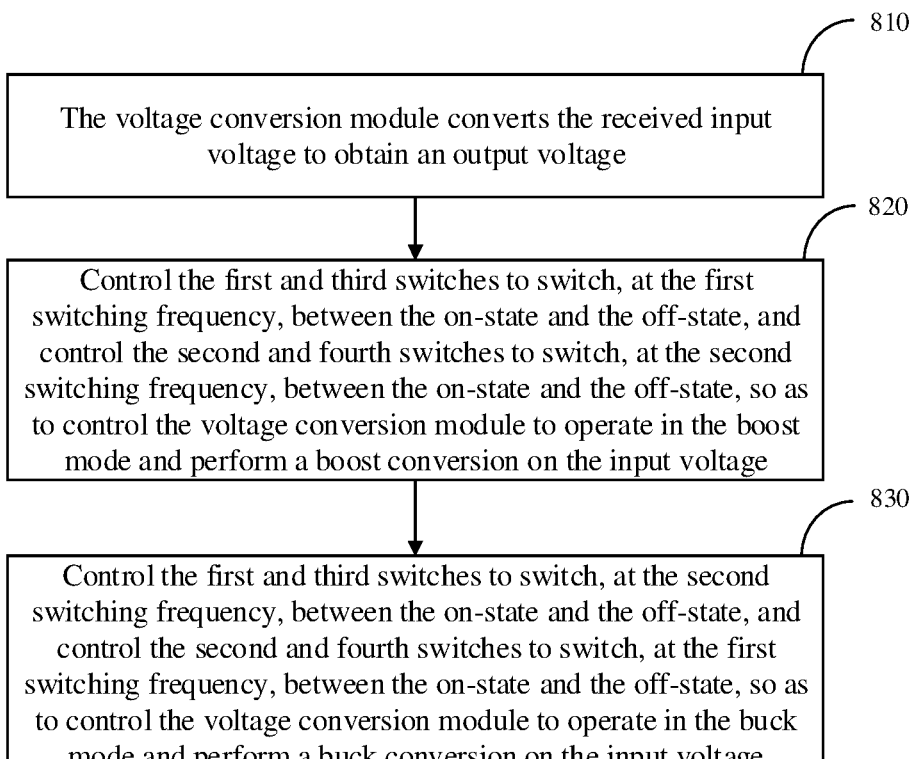

810

The voltage conversion module converts the received input voltage to obtain an output voltage

820

Control the first and third switches to switch, at the first switching frequency, between the on-state and the off-state, and control the second and fourth switches to switch, at the second switching frequency, between the on-state and the off-state, so as to control the voltage conversion module to operate in the boost mode and perform a boost conversion on the input voltage

830

Control the first and third switches to switch, at the second switching frequency, between the on-state and the off-state, and control the second and fourth switches to switch, at the first switching frequency, between the on-state and the off-state, so as to control the voltage conversion module to operate in the buck mode and perform a buck conversion on the input voltage

Processor

Coupling

920

Memory

Electronic device

FIG. 9

SWITCH CONTROL CIRCUIT, ELECTRONIC DEVICE AND SWITCH CONTROL METHOD

CROSS-REFERENCE OF RELATED APPLICATION

This application is a continuation of international application No. PCT/CN2022/083653, filed Mar. 29, 2022, which claims priority to Chinese patent application No. 202110497098.6, filed May 7, 2021, and both of which are herein incorporated by reference in their entireties.

TECHNICAL FIELD

The present disclosure relates to the technical field of electronic circuits, and in particular to a switch control circuit, an electronic device, and a switch control method.

BACKGROUND

At present, many electronic products on the market use a double-bridge arm circuit composed of four switches, such as a four-switch Buck-Boost circuit, for voltage modulation, conversion, and other functions. The double-bridge arm circuit composed of four switches may usually operate in many different operating modes, and switches that need to be turned on or off in different operating modes are different. It is thus necessary to design corresponding control circuits to control individual switches to be on or off in different operating modes. The existing control circuits have a complicated design and a high cost.

SUMMARY

Embodiments of the present disclosure provide a switch control circuit, an electronic device, and a switch control method.

The embodiments of the present disclosure provide a switch control circuit, the switch control circuit including:

a voltage conversion module, including a first switch, a second switch, a third switch and a fourth switch, where the first switch and the third switch constitute a first bridge arm, the second switch and the fourth switch constitute a second bridge arm, and the voltage conversion module is configured to receive an input voltage and operate, based on the input voltage, in at least one of a boost mode, a buck mode, and a buck-boost mode; and a control module, where the control module is configured to control the first switch and the third switch to switch, at a first switching frequency, between an on-state and an off-state, and control the second switch and the fourth switch to switch, at a second switching frequency, between the on-state and the off-state, so as to control the voltage conversion module to operate in the boost mode and perform a boost conversion on the input voltage; and the control module is further configured to control the first switch and the third switch to switch, at the second switching frequency, between the on-state and the off-state, and control the second switch and the fourth switch to switch, at the first switching frequency, between the on-state and the off-state, so as to control the voltage conversion module to operate in the buck mode and perform a buck conversion on the input voltage, the first switching frequency being less than the second switching frequency.

The embodiments of the present disclosure provide an electronic device including a switch control circuit. The switch control circuit includes a voltage conversion module and a control module. The voltage conversion module includes a first switch, a second switch, a third switch and a fourth switch. The first switch and the third switch constitute a first bridge arm, and the second switch and the fourth switch constitute a second bridge arm. The voltage conversion module is configured to receive an input voltage and operate, based on the input voltage, in at least one of a boost mode, a buck mode, and a buck-boost mode. The control module is configured to control the first switch and the third switch to switch, at a first switching frequency, between an on-state and an off-state, and control the second switch and the fourth switch to switch, at a second switching frequency, between the on-state and the off-state, so as to control the voltage conversion module to operate in the boost mode and perform a boost conversion on the input voltage. The control module is further configured to control the first switch and the third switch to switch, at the second switching frequency, between the on-state and the off-state, and control the second switch and the fourth switch to switch, at the first switching frequency, between the on-state and the off-state, so as to control the voltage conversion module to operate in the buck mode and perform a buck conversion on the input voltage, the first switching frequency being less than the second switching frequency.

The embodiments of the present disclosure provide a switch control method, including:

converting, by a voltage conversion module, a received input voltage to obtain an output voltage, where the voltage conversion module includes a first switch, a second switch, a third switch, and a fourth switch, the first switch and the third switch constitute a first bridge arm, the second switch and the fourth switch constitute a second bridge arm, and the voltage conversion module is configured to operate, based on the input voltage, in at least one of a boost mode, a buck mode, and a buck-boost mode;

controlling the first switch and the third switch to switch, at a first switching frequency, between an on-state and an off-state, and controlling the second switch and the fourth switch to switch, at a second switching frequency, between the on-state and the off-state, so as to control the voltage conversion module to operate in the boost mode and perform a boost conversion on the input voltage;

controlling the first switch and the third switch to switch, at the second switching frequency, between the on-state and the off-state, and controlling the second switch and the fourth switch to switch, at the first switching frequency, between the on-state and the off-state, so as to control the voltage conversion module to operate in the buck mode and perform a buck conversion on the input voltage, the first switching frequency being less than the second switching frequency.

Details of one or more embodiments of the present disclosure are set forth in the following drawings and description. Other features and benefits of the present disclosure are reflected from the description, drawings and claims.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF DRAWINGS

In order to provide clearer explanation of technical solutions in the embodiments of the present disclosure, drawings required in the description of the embodiments are introduced briefly below. It is evident that the drawings in the following description are only some embodiments of the present disclosure. For those skilled in the art, other drawings may be obtained based on these drawings without any creative effort.

FIG. 8 is a schematic flowchart of a switch control method according to an embodiment.

FIG. 9 is a schematic structural block diagram of an electronic device according to an embodiment.

DETAILED DESCRIPTION OF EMBODIMENTS

In the following, the technical schemes in the embodiments of the present disclosure are clearly and comprehensively described with reference to the drawings in the embodiments of the present disclosure. Apparently, the described embodiments are only a part of the embodiments of the present disclosure, but not all the embodiments. Based on the embodiments of the present disclosure, all other embodiments obtained by those ordinary skilled in the art without creative work belong to the protection scope of the present disclosure.

It is notable that the terms "include" and "have" and any variations thereof in the embodiments and drawings of the present disclosure, are intended to cover a non-exclusive inclusion. For example, a process, method, system, product or device that includes a series of operations or units is not limited to the listed operations or units, but optionally includes operations or units that are not listed, or optionally further includes other operations or units that are inherent to these process, method, product or device.

It is understood that the terms "first", "second" and the like in the present disclosure may be used to describe various elements herein, but these elements are not limited by these terms. These terms are only used to distinguish one element from another element. For example, without departing from the scope of the present disclosure, a first switch may be called a second switch, and similarly, a second switch may be called a first switch. Both the first switch and the second switch are switches, but they are not the same switch.

At present, many electronic products on the market use a double-bridge arm circuit composed of four switches, such as a four-switch Buck-Boost circuit and a DC motor H-bridge driving circuit composed of four switches. The double-bridge arm circuit composed of four switches may usually operate in many different operating modes, and in different operating modes, the switches that need to be turned on or off are different. In some operating modes, it is necessary to keep the switch in the upper half of a certain bridge arm being in an on-state. It is thus necessary to design a separate driving circuit to for this function, which causes the circuit to have a complicated design and a high cost.

Figure 1:
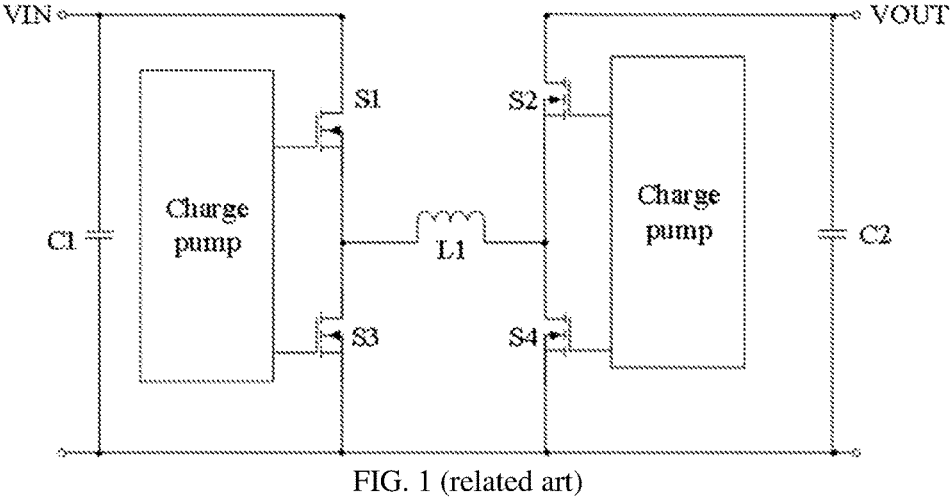
FIG. 1 is a schematic circuit diagram of a Buck-Boost circuit in the related art.

Taking the Buck-Boost circuit illustrated in FIG. 1 as an example, when the Buck-Boost circuit is in a Buck mode, a switch S1 and a switch S3 of a left arm (which is connected with an input terminal VIN) need to be frequently turned on and off, and thus be switched constantly between an on-state and an off-state. In order to reduce a switching loss, a switch S2 of a right arm (which is connected with the output terminal VOUT) needs to be kept in the on-state, and switch S4 of the right arm needs to be kept in the off-state. When the Buck-Boost circuit is in the Boost mode, in order to reduce the switching loss, the switch S1 of the left arm needs to be kept in the on-state, and the switch S3 of the left arm is kept in the off-state; in addition, the switches S2 and S4 of the right arm need to be frequently turned on and off, and thus be switched constantly between the on-state and the off-state.

In a traditional way, in order to keep the switch S1 or S2 being in the on-state when the Buck-Boost circuit is in the Buck mode or Boost mode, it is necessary to add an additional independent driving circuit. For example, in FIG. 1, two independent charge pump driving circuits need to be added respectively to the left and right arms of the bridge. The charge pump driving circuits may provide voltages for the switches S1 and S2, so that the switch S1 can be kept in the on-state in the Boost mode, and the switch S2 can be kept in the on-state in the Buck mode. Alternatively, a circuit needs to be separately provided inside the controller to enable switch S1 or S2 to be normally on. Thus, the whole control circuit is caused to have a complicated design and a high cost.

Figure 2:
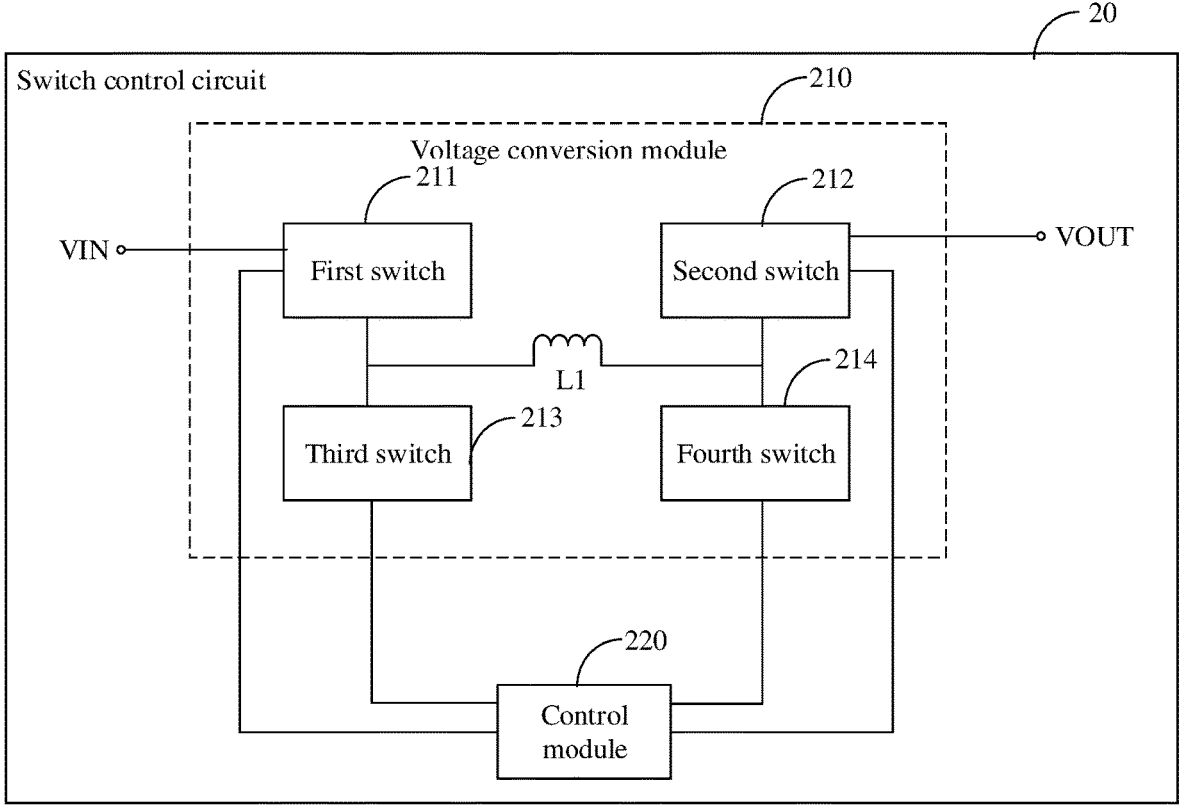
FIG. 2 is a schematic structural block diagram of a switch control circuit according to an embodiment.

As illustrated in FIG. 2, in an embodiment, a switch control circuit 20 is provided, which may include a voltage conversion module 210 and a control module 220. The voltage conversion module 210 may include a first switch 211, a second switch 212, a third switch 213 and a fourth switch 214. The first switch 211 and the third switch 213 may constitute a first bridge arm. The first switch 211 may be connected with an input terminal (VIN) of the voltage conversion module 210, and the third switch 213 may be grounded. The second switch 212 and the fourth switch 214 may constitute a second bridge arm. The second switch 212 may be connected with an output terminal (VOUT) of the voltage conversion module 210, and the fourth switch 214 may be grounded.

The voltage conversion module 210 is configured to receive an input voltage, and operate, based on the input voltage, in at least one of a boost mode, a buck mode and a buck-boost mode.

The voltage conversion module 210 may convert the received input voltage to obtain an output voltage. The input voltage may be a DC voltage. For example, the input voltage may be a pulsating DC voltage or a less stable DC voltage. The pulsating DC voltage refers to a DC voltage with a constant direction and a magnitude periodically changing over time. A pulsating wave of the input voltage may be in a square waveform, a waveform obtained through full wave rectification or half wave rectification, and the like. The output voltage may be a stable DC voltage. For example, the output voltage may be a constant DC voltage or an approximately constant DC voltage (with an extremely small amplitude). The constant DC voltage refers to a DC voltage with a fixed voltage. The voltage conversion module 210 may convert the input voltage to obtain a stable output voltage for output.

The voltage conversion module 210 may switch between different operating modes based on the input voltage, where the operating modes may include the boost mode, the buck mode, the buck-boost mode, etc. When the input voltage is too low, the voltage conversion module 210 may operate in the boost mode, in which the voltage conversion module 210 may perform a boost conversion on the received input voltage. When the input voltage is too high, the voltage conversion module 210 operates in the buck mode, in which the voltage conversion module 210 may perform a buck conversion on the input voltage. In this way, the stability of the output voltage output by the voltage conversion module is ensured.

The control module 220 is configured to control the first switch 211 and the third switch 213 to switch, at the first switching frequency, between the on-state and the off-state, and control the second switch 212 and the fourth switch 214 to switch, at the second switching frequency, between the on-state and the off-state, so that the voltage conversion module 210 operates in the boost mode and performs the boost conversion on the input voltage.

The control module 220 is further configured to control the first switch 211 and the third switch 213 to switch, at the second switching frequency, between the on-state and the off-state, and control the second switch 212 and the fourth switch 214 to switch, at the first switching frequency, between the on-state and the off-state, so that the voltage conversion module 210 operates in the buck mode and performs the buck conversion on the input voltage.

In some embodiments, the voltage conversion module 210 may include a Buck-Boost circuit, and the Buck-Boost circuit may convert the too high or too low DC voltage into the stable DC voltage. The voltage conversion module 210 may include an inductor L1 through which the first bridge arm and the second bridge arm may be connected to form an H-shaped circuit.

The control module 220 may include, but is not limited to, processing chips such as a central processing unit (CPU) and a Microcontroller Unit (MCU). In some embodiments, the control module 220 may switch the operating mode of the voltage conversion module 210, according to the voltage comparison result between the input voltage input to the voltage conversion module 210 and the output voltage output by the voltage conversion module 210. In some implementations, when the input voltage is too low, the control module 220 may control the voltage conversion module 210 to operate in the boost mode. When the input voltage is too high, the control module 220 may control the voltage conversion module to operate in the buck mode.

In the embodiments of the present disclosure, the control module 220 may control, according to the currently required operating mode of the voltage conversion module 210, the switch frequency of each of the first switch 211, the second switch 212, the third switch 213 and the fourth switch 214. The switching frequency may refer to the switching times of the switch in unit time, and the switching times may be the times of switching to the on-state or the times of switching to the off-state in unit time. The switching frequency may be configured to represent the switching speed of the switch between the on-state and the off-state. The higher the switching frequency, the faster the switching speed, and the more frequently the switch is switched between the on-state and the off-state. The lower the switching frequency, the slower the switching speed, the fewer times the switch is switched between the on-state and the off-state, and the longer the time during which the switch is in the on-state or off-state in each switching.

When the voltage conversion module 210 operates in the boost mode, the first switch 211 needs to be kept normally on, the third switch 213 needs to be kept normally off, and the second switch 212 and the fourth switch 214 need to be switched between the on-state and the off-state frequently, so as to enable the boost conversion on the input voltage.

The control module 220 may control the first switch 211 and the third switch 213 to operate at the first switching frequency, and control the second switch 212 and the fourth switch 214 to operate at the second switching frequency. The first switching frequency may be less than the second switching frequency. For example, the first switching frequency may be 2 KHz (kilohertz), 3 KHz, 2.34 KHz, etc., and the second switching frequency may be 2 MHz (megahertz), 3 MHz, 3.43 MHz, etc., and the specific values thereof are not limited in the embodiment of the present disclosure. By reducing the switching frequency, the operating states of the first switch 211 and the third switch 213 may be switched at an extremely low frequency, so that the first switch 211 is enabled to be normally on. The second switch 212 and the fourth switch 214 may be switched between the on-state and the off-state at a high frequency, which enables chopping modulation to be performed on the input voltage. In addition, the inductor L1 is utilized to boost the voltage to obtain a stable output voltage. Thus, it is ensured that the voltage conversion module 210 operates normally in the boost mode.

When the voltage conversion module 210 operates in the buck mode, the first switch 211 and the third switch 212 need to be frequently switched between the on-state and the off-state, the second switch 212 needs to be kept normally on and the third switch 213 needs to be kept normally off, so as to enable the buck conversion on the input voltage.

The control module 220 may control the first switch 211 and the third switch 213 to operate at the second switching frequency, and control the second switch 212 and the fourth switch 214 to operate at the first switching frequency. By reducing the frequency, the operating states of the second switch 212 and the fourth switch 214 may be switched at an extremely low frequency, so that the second switch 211 is enabled to be normally on. The first switch 211 and the third switch 213 may be switched between the on-state and the off-state at a high frequency, which enables the chopping modulation on the input voltage. In addition, the inductor L1 is utilized to buck the voltage to obtain a stable output voltage. Thus, it is ensured that the voltage conversion module 210 operates normally in the buck mode.

In the embodiment of the present disclosure, no matter in the boost mode or the buck mode, the four switches of the voltage conversion module 210 are constantly switched between the on-state and the off-state. The control module only needs to control the switching frequency of each switch, thereby simplifying the control over each switch. Also, there is no need to design an independent driving circuit or control circuit to keep the first switch 211 or the second switch 212 being in the on-state. Thus, the switch control circuit is simplified and the circuit cost is reduced.

Moreover, when the voltage conversion module 210 operates in the boost mode, the first switch 211 and the third switch 213 may operate at the low first switching frequency. When the voltage conversion module 210 operates in the buck mode, the second switch 212 and the fourth switch 214 may operate at the low first switching frequency. This can reduce the switching loss and improve the product performance of the switch control circuit.

In the embodiments of the present disclosure, the switches provided in the same bridge arm of the voltage conversion module 210 are not switched on or switched off at the same time, so as to ensure that the voltage conversion module 210 can operate normally. Specifically, when the first switch 211 is in the on-state, the third switch 213 is in the off-state. When the first switch 211 is in the off-state, the third switch 213 is in the on-state. When the second switch 212 is in the on-state, the fourth switch 214 is in the off-state. When the second switch 212 is in the off-state, the fourth switch 214 is in the on-state.

In the boost mode, an on-time during which the first switch 211 is in the on-state is longer than an off-time during which the first switch 211 is in the off-state, an off-time during which the third switch 213 is in the off-state is longer than an on-time during which the third switch 213 is in the on-state, and the on-time of the first switch 211 is equal to the off-time of the third switch 213. It may ensure that the first switch 211 is in the on-state most of the time in the boost mode, which meets the requirements that, in the boost mode, the first switch 211 is normally on and the third switch 213 is normally off. In some implementations, in the boost mode, the on-time during which the second switch 212 is in the on-state may be close to or the same as the off-time during which the second switch 212 is in the off-state, and the on-time during which the fourth switch 214 is in the on-state may be close to or the same as the off-time during which the fourth switch 214 is in the off-state.

In the buck mode, the on-time during which the second switch 212 is in the on-state is longer than the off-time during which the second switch 212 is in the off-state, the off-time during which the fourth switch 214 is in the off-state is longer than the on-time during which the fourth switch 214 is in the on-state, and the on-time of the second switch 212 is equal to the off-time of the fourth switch 214. It may ensure that the second switch 212 is in the on-state most of the time in the buck mode, which meets the requirements that, in the buck mode, the second switch 212 is normally on and the fourth switch 214 is normally off. In some implementations, in the buck mode, the on-time during which the first switch 211 is in the on-state may be close to or the same as the off-time during which the first switch 211 is in the off-state, and the on-time during which the third switch 213 is in the on-state may be close to or the same as the off-time during which the third switch 213 is in the off-state.

Figure 3:
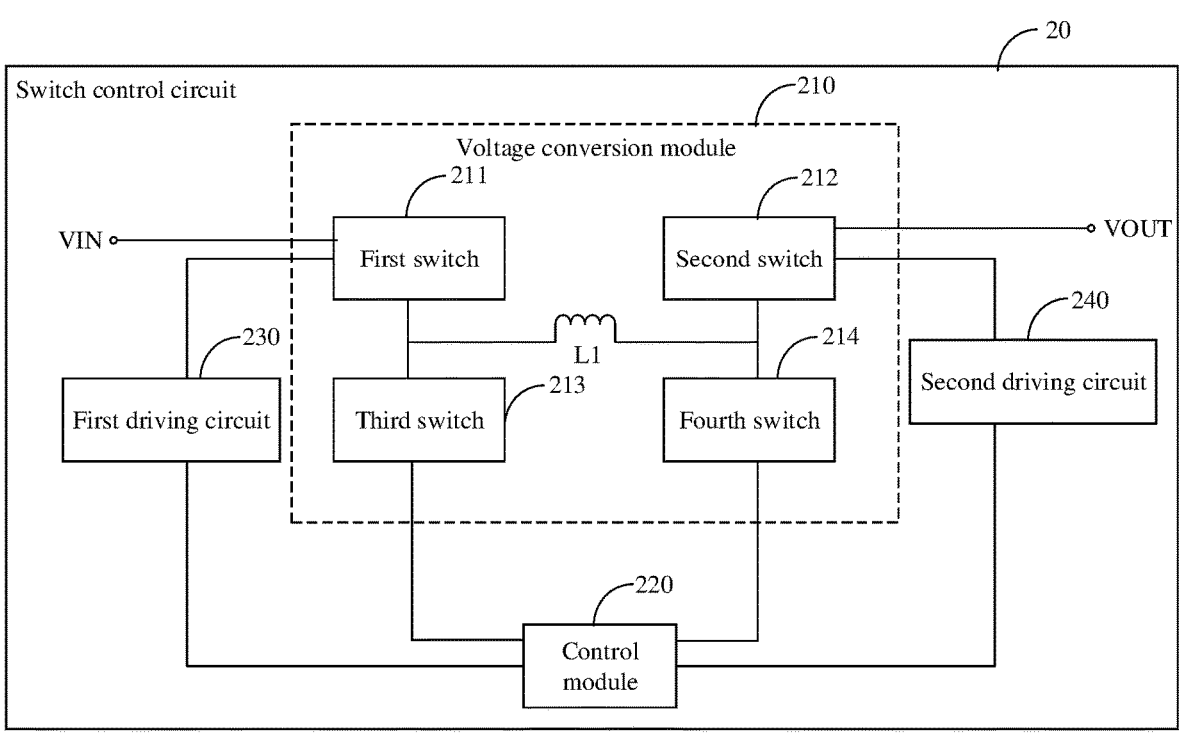
FIG. 3 is a schematic structural block diagram of a switch control circuit according to another embodiment.

As illustrated in FIG. 3, in an embodiment, the above switch control circuit 20 includes a first driving circuit 230 and a second driving circuit 240, in addition to the voltage conversion module 210 and the control module 220. The first driving circuit 230 may be connected with the first switch 211, the second driving circuit 240 may be connected with the second switch 212, and an input terminal of the first driving circuit 230 and an input terminal of the second driving circuit 240 may be connected with an output terminal of the control module 220.

The control module 220 is further configured to: send, according to the first switching frequency, a first pulse signal to the first driving circuit 230, when the voltage conversion module 210 operates in the boost mode; and send, according to the first switching frequency, the first pulse signal to the second driving circuit 240, when the voltage conversion module 210 operates in the buck mode.

When the voltage conversion module 210 is in the boost mode, the control module 220 may send the first pulse signal to the first driving circuit 230. When the voltage conversion module 210 is in the buck mode, the control module 220 may send the first pulse signal to the second driving circuit 240. The pulse frequency of the first pulse signal may be the first switching frequency. The pulse frequency may refer to the number of pulse periods contained in a unit time. One pulse period may include a first level signal and a second level signal. For example, the first level signal may be a high level signal, and the second level signal may be a low level signal; alternatively, the first level signal may be the low level signal, and the second level signal may be the high level signal.

In the first pulse signal, a time ratio of the first level signal in each pulse period is greater than a time ratio of the second level signal in the pulse period, where the first level signal may be an electric level capable of triggering the first driving circuit 230 or the second driving circuit 240 to output a driving voltage, and the second level signal may be an electric level capable of triggering the first switch 211 or the second switch 212 to be switched off. The first level signal may be the high level signal or the low level signal, depending on the specific circuit structures of the first driving circuit 230 and the second driving circuit 240.

The first driving circuit 230 is configured to, when the received first pulse signal is a first level signal, provide the driving voltage to the first switch 211, so as to drive the first switch 211 to keep being in the on-state.

The second driving circuit 240 is configured to, when the received first pulse signal is the first level signal, provide the driving voltage to the second switch 212, so as to drive the second switch to keep being in the on-state.

In the pulse period of the first pulse signal, the time ratio of the first level signal is greater than that of the second level signal. The time ratio of the first level signal may be a percentage of the duration of the first level signal in each pulse period to the whole duration of the pulse period. The time ratio of the second level signal is a percentage of the duration of the second level signal in each pulse period to the whole duration of the pulse period. For example, the time ratio of the first level signal is 90%, 88%, etc., and the time ratio of the second level signal may be correspondingly 10%, 12%, etc. The time ratio of the first level signal may be set according to actual demands and it is not limited here. Therefore, the first switch 211 may be ensured to be in the on-state for a long time in the boost mode, and the second switch 212 may be ensured to be in the on-state for a long time in the buck mode, thereby ensuring that the voltage conversion module 210 can operate normally in different operating modes.

Figure 4A:
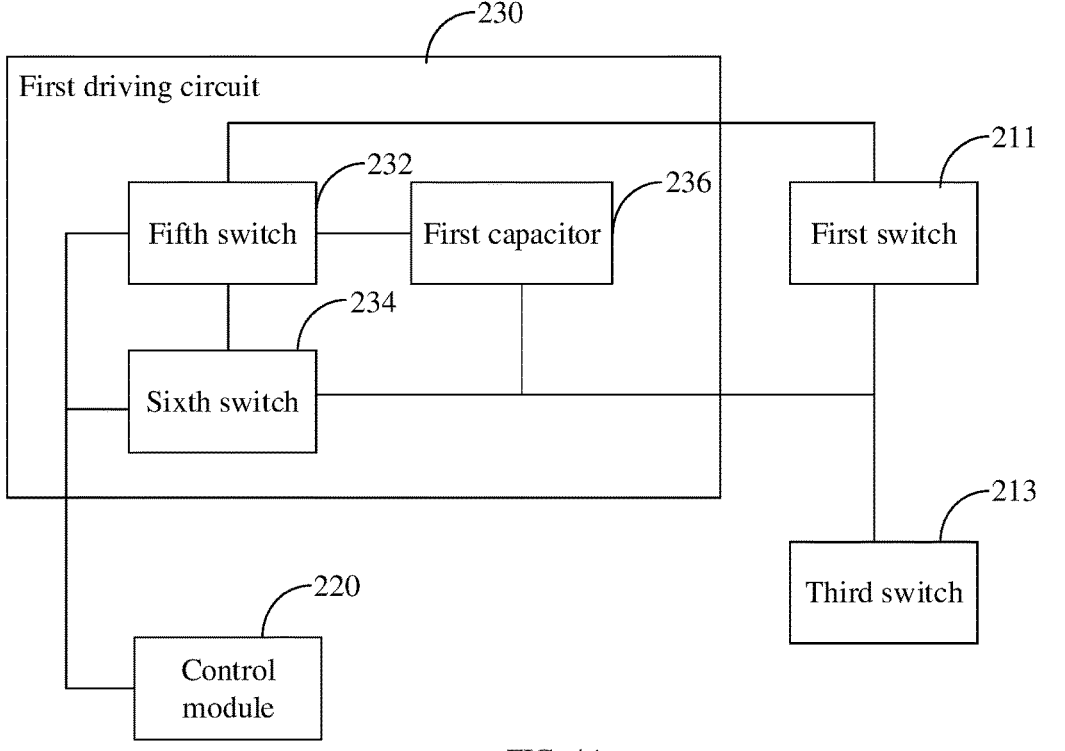
FIG. 4A is a schematic structural block diagram of a first driving circuit according to an embodiment.

FIG. 4A is a schematic structural block diagram of the first driving circuit according to an embodiment. In an embodiment, as illustrated in FIG. 4A, the first driving circuit 230 may include a fifth switch 232, a sixth switch 234, and a first capacitor 236. Each of the fifth switch 232 and the sixth switch 234 may be connected with the control module 220, a first terminal of the first capacitor 236 may be connected with the first switch 211 through the fifth switch 232, and a second terminal of the first capacitor 236 may be connected with the sixth switch 234.

The fifth switch 232 is configured to be in the on-state when the first pulse signal sent by the control module 220 is the first level signal, and be in the off-state when the first pulse signal sent by the control module 220 is the second level signal.

The sixth switch 234 is configured to be in the on-state when the first pulse signal sent by the control module 220 is the second level signal, and be in the off-state when the first pulse signal sent by the control module 220 is the first level signal.

The first capacitor 236 is configured to, when the fifth switch 232 is in the on-state, the driving voltage to the first switch 211, so as to drive the first switch 211 to be in the on-state.

The fifth switch 232 and the sixth switch 234 may arranged in the circuit in a push-pull construction. During the operation of the fifth switch 232 and the sixth switch 234, only one of them may be turned on, thus improving driving force of the circuit.

In some embodiments, the first terminal of the first capacitor 236 is further connected with a power terminal, and the second terminal of the first capacitor 236 is further connected with the third switch 213. The first capacitor is further configured to be charged according to a voltage provided by the power terminal, when the fifth switch 232 is in the off-state and the third switch 213 is in the on-state.

Figure 4B:
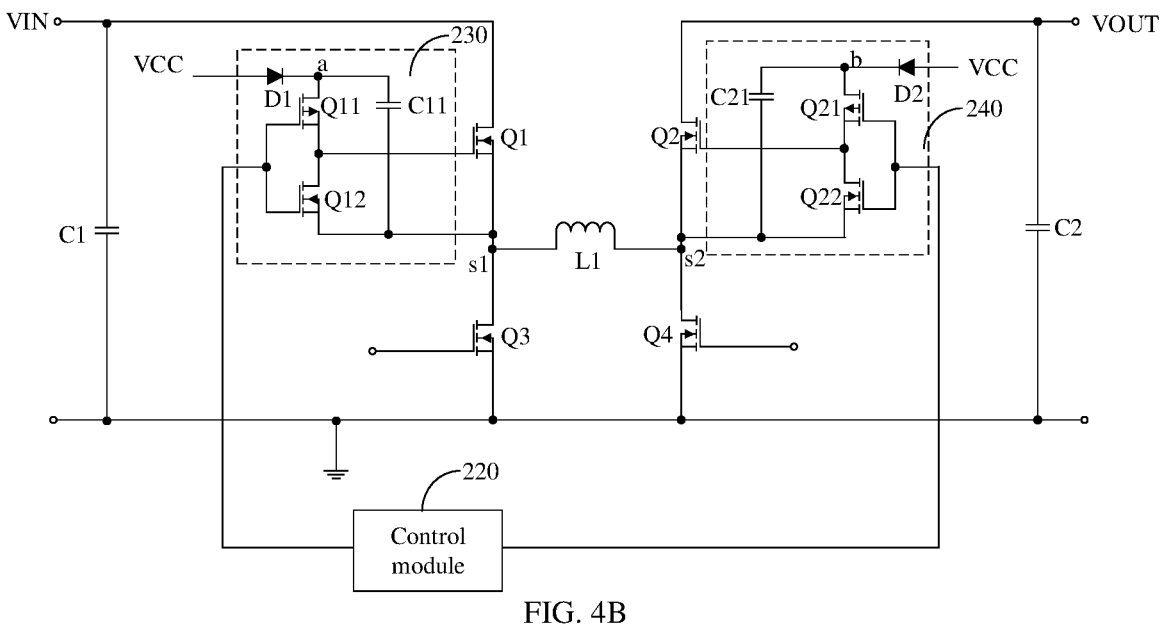
FIG. 4B is a schematic circuit diagram of a switch control circuit according to an embodiment.

FIG. 4B is a schematic circuit diagram of the switch control circuit according to an embodiment. As illustrated in FIG. 4B, in an embodiment, the first switch 211, the second switch 212, the third switch 213 and the fourth switch 214 may all be N-type MOS transistors (metal-oxide semiconductor field-effect transistor, MOSFET). The first switch 211 may include a first field-effect transistor Q1, the second switch 212 may include a second field-effect transistor Q2, the third switch 213 may include a third field-effect transistor Q3, and the fourth switch 214 may include a fourth field-effect transistor Q4.

The first driving circuit 230 may include a fifth switch Q11, a sixth switch Q12 and a first capacitor C11. A first terminal of the first capacitor C11 may be connected with the gate (G electrode) of the first field-effect transistor Q1 through the fifth switch Q11. Further, the fifth switch Q11 may be a P-type MOS transistor, and the sixth switch Q12 may be the N-type MOS transistor. The G electrode of the fifth switch Q11 may be connected with the output terminal of the control module 220. The source (S electrode) of the fifth switch Q11 may be connected with each of the drain (D electrode) of the sixth switch Q12 and the G electrode of the first field-effect transistor Q1. The D electrode of the fifth switch Q11 may be connected with the first terminal of the first capacitor C11.

The D electrode of the first field-effect transistor Q1 may be connected with the input terminal (VIN), and the S electrode of the first field-effect transistor Q1 may be connected with each of the third switch 213 (that is the third field-effect transistor Q3 in FIG. 4B), the sixth switch Q12 and the second terminal of the first capacitor C11.

When the third field-effect transistor Q3 is turned on, because the S electrode of the third field-effect transistor Q3 is grounded, the voltage at point s1 may be 0V (volt). In the boost mode, once the first pulse signal, output by the control module 220 to the fifth switch Q11 and the sixth switch Q12, is the low level signal, the fifth switch Q11 is turned on and the sixth switch Q12 is turned off, and at this time, the third field-effect transistor Q3 is turned off. Since the first capacitor C11 is fully charged, the voltage at point a is higher than the voltage at point s1, that is, the voltage at the G electrode of the first field-effect transistor Q1 is higher than the voltage at the S electrode thereof, and the voltage difference between the G electrode and the S electrode of the first field-effect transistor Q1 is equal to the voltage of the first capacitor C11, which triggers the first field-effect transistor Q1 to be turned on.

After the first field-effect transistor Q1 is turned on, the voltage at point s1 is raised and leveled with the voltage at the input terminal VIN. At this time, the voltage at point a becomes the sum of the voltage at the input terminal VIN and the voltage of the first capacitor C11. Therefore, the voltage at point a is higher than the voltage at point s1, and the voltage difference between the G electrode and the S electrode of the first field-effect transistor Q1 is still the voltage of the first capacitor C11, and the first field-effect transistor Q1 continues being turned on. As a bootstrap capacitor, the first capacitor C11 may provide, by using the characteristic that the voltage across the capacitor cannot change abruptly, the driving voltage to the G electrode of the first field-effect transistor Q1, so that the voltage at the G electrode of the first field-effect transistor Q1 is greater than the voltage at the S electrode of the first field-effect transistor Q1, and the voltage difference between the G electrode and the S electrode of the first field-effect transistor Q1 is greater than a certain value (such as 5V, etc.), which enables the first field-effect transistor Q1 to be kept being on.

In some embodiments, since the voltage of the first capacitor C11 may gradually decrease, the first pulse signal, which is output by the control module 220 to the fifth switch Q11 and the sixth switch Q12, becomes a high level signal after the first field-effect transistor Q1 is turned on for a period of time. At this time, the fifth switch Q11 is turned off, and the sixth switch Q12 is turned on, that is, the first field-effect transistor Q1 is turned off and the third field-effect transistor Q3 is turned on, then the power terminal VCC may charge the first capacitor C11.

As a specific implementation, as illustrated in FIG. 4B, the first driving circuit 230 further includes a first diode D1. The first terminal of the first capacitor C11 may be connected with a negative pole of the first diode D1, and a positive pole of the first diode D1 may be connected with the power terminal VCC. When the third switch 213 (that is, the third field-effect transistor Q3 in FIG. 4B) is in the on-state, the power terminal VCC charges the first capacitor C11 through the first diode D1. After the voltage of the first capacitor C11 decreases, the voltage at the power terminal VCC is greater than the voltage at point a and the first diode D1 is turned on. Then, the power terminal VCC charges the first capacitor C11, and the voltage of the first capacitor C11 gradually rises. Correspondingly, the voltage at point a gradually rises, and the first diode D1 is turned off, then the power terminal VCC stops charging the first capacitor C11, so that the voltage of the first capacitor C11 is equal to the voltage at the power terminal VCC. Moreover, when the first capacitor C11 is discharged to trigger the first field-effect transistor Q1 to be turned on, the voltage at point a is greater than the voltage at the power terminal VCC. By means of the first diode, the voltage of the first capacitor C11 may be prevented from being output to the power terminal VCC, which ensures safety of the circuit and prevents unnecessary loss of the electric energy of the first capacitor C11.

In the embodiments of the present disclosure, the first capacitor C11 can provide the driving voltage to the first switch 211, so that the first switch 211 is kept in the on-state most of the time in the boost mode, and has a very high conduction ratio. Moreover, since all the four switches in the voltage conversion module 210 are constantly switched between the on-state and the off-state, after the third switch 213 is turned on, the first capacitor C11 can be charged, which ensures that the first capacitor C11, serving as the bootstrap capacitor, can operate normally.

The first driving circuit 230 only adds the first capacitor C11 and the first diode D1 on the basis of the half-bridge driver in the related art (that is, the fifth switch Q11 and the sixth switch Q12 mentioned above), which greatly simplifies the design of the driving circuit, makes an isolation driver or charge pump driver omitted, and enables the free switching of the voltage conversion module 210 between different operating modes. As such, the design of the switch control circuit is simplified, and the complexity and cost of the circuit are reduced, while ensuring that the efficiency of the product is substantially unaffected. In addition, since the four switches of the voltage conversion module 210 are constantly switched between the on-state and the off-state in all the various operating modes, the mode switching of the voltage conversion module 210 may be performed smoothly, which improves the product performance.

In some implementations, a capacitor C1 and a capacitor C2 may be configured to filter the voltage, to ensure the stability of the output voltage.

Figure 4C:
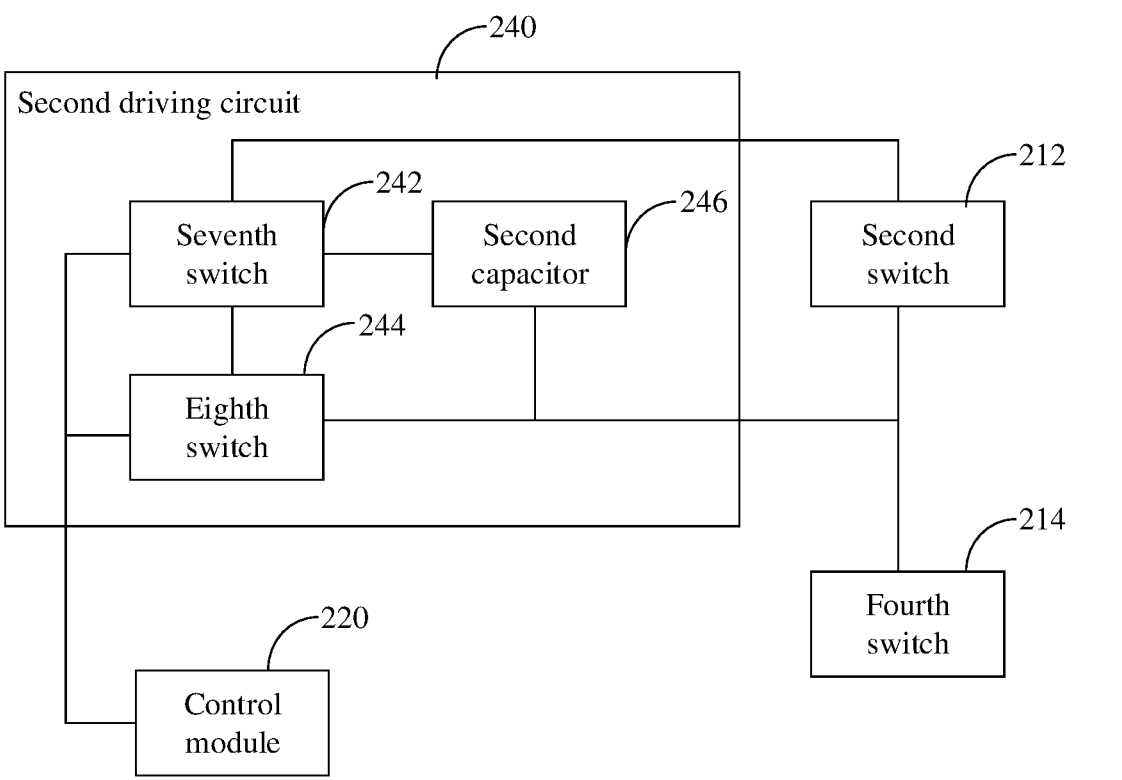
FIG. 4C is a schematic structural block diagram of a second driving circuit according to an embodiment.

FIG. 4C is a schematic structural block diagram of the second driving circuit according to an embodiment. In an embodiment, as illustrated in FIG. 4C, the second driving circuit 240 may include a seventh switch 242, an eighth switch 244 and a second capacitor 246. Each of the seventh switch 242 and the eighth switch 244 may be connected with the control module 220, and a first terminal of the second capacitor 246 may be connected with the second switch 212 through the seventh switch 242, and a second terminal of the second capacitor 246 is connected with the eighth switch 244.

The seventh switch 242 is configured to be in the on-state when the first pulse signal sent by the control module 220 is the first level signal, and be in the off-state when the first pulse signal sent by the control module 220 is the second level signal.

The eighth switch 244 is configured to be in the on-state when the first pulse signal sent by the control module 220 is the second level signal, and be in the off-state when the first pulse signal sent by the control module 220 is the first level signal.

The second capacitor 246 is configured to, when the seventh switch 242 is in the on-state, provide the driving voltage to the second switch 212, so as to drive the second switch 212 to be in the on-state.

In some embodiments, the first terminal of the second capacitor 246 is further connected with the power terminal, and the second terminal of the second capacitor 246 is further connected with the fourth switch 214. The second capacitor 246 is further configured to be charged according to the voltage provided by the power terminal, when the seventh switch 242 is in the off-state and the fourth switch 214 is in the on-state.

In an embodiment, as illustrated in FIG. 4B, the second driving circuit 240 may include a seventh switch Q21, an eighth switch Q22 and a second capacitor C21. A first terminal of the first capacitor C21 may be connected with the G electrode of the second field-effect field Q2 through the seventh switch Q21. Further, the seventh switch Q21 may be the P-type MOS transistor, and the eighth switch Q22 may be the N-type MOS transistor. The G electrode of the seventh switch Q21 may be connected with the output terminal of the control module 220, the S electrode of the seventh switch Q21 may be connected with the D electrode of the eighth switch Q22 and the G electrode of the second field-effect transistor Q2, and the D electrode of the seventh switch Q21 may be connected with the first terminal of the second capacitor C21.

The D electrode of the second field-effect transistor Q2 may be connected with the output terminal (VOUT), and the S electrode of the second field-effect transistor Q2 may be connected with the fourth switch 214 (that is, the fourth field-effect transistor Q4 in FIG. 4B), the S electrode of the eighth switch Q22 and the second terminal of the second capacitor C21.

When the fourth field-effect transistor Q4 is turned on, because the S electrode of the fourth field-effect transistor Q4 is grounded, the voltage at point s2 may be 0V. In the buck mode, once the first pulse signal, which is output by the control module 220 to the seventh switch Q21 and the eighth switch Q22, is the low level signal, the seventh switch Q21 is turned on and the eighth switch Q22 is turned off, and at that time, the fourth field-effect transistor Q4 is turned off. Since the second capacitor C21 is fully charged, the voltage at point b is higher than the voltage at point s2, that is, the voltage at the G electrode of the second field-effect transistor Q2 is higher than the voltage at the S electrode thereof, and the voltage difference between the G electrode and the S electrode of the second field-effect transistor Q2 is the voltage of the second capacitor C21, which triggers the second field-effect transistor Q2 to be turned on.

After the second field-effect transistor Q2 is turned on, the voltage at point s2 is raised and leveled with the voltage at the output terminal VOUT. At this time, the voltage at point b becomes the sum of the voltage at the output terminal VOUT and the voltage of the second capacitor C21. Therefore, the voltage at point b is higher than the voltage at point s2, and the voltage difference between the G electrode and the S electrode of the second field-effect transistor Q2 is still the voltage of the second capacitor C21, and the second field-effect transistor Q2 continues being turned on. As a bootstrap capacitor, the second capacitor C21 may provide, by using the characteristic that the voltage across the capacitor cannot change abruptly, the driving voltage to the G electrode of the second field-effect transistor Q2. As such, the voltage of the G electrode of the second field-effect transistor Q2 is greater than the voltage of the S electrode thereof, and the voltage difference between the G electrode voltage and the S electrode voltage of the second field-effect transistor Q2 is greater than a certain value (such as 5V, etc.), which enables the second field-effect transistor Q2 to be kept turned on.

In some embodiments, since the voltage of the second capacitor C21 may gradually decrease, the first pulse signal, which is output by the control module 220 to the seventh switch Q21 and the eighth switch Q22, becomes the high level signal after the second field-effect transistor Q2 is turned on for a period of time. At this time, the seventh switch Q21 is turned off and the eighth switch Q22 is turned on, that is, the second field-effect transistor Q2 is turned off and the fourth field-effect transistor Q4 is turned on, then the power terminal VCC may charge the second capacitor C21.

As a specific implementation, as illustrated in FIG. 4B, the second driving circuit 240 further includes a second diode D2. The first terminal of the second capacitor C21 may be connected with a negative pole of the second diode D2, and a positive pole of the second diode D2 may be connected with the power terminal VCC. When the fourth switch 214 (i.e., the fourth field-effect transistor Q4 in FIG. 4B) is in the on-state, the power terminal VCC charges the second capacitor C21 through the second diode D2. After the voltage of the second capacitor C21 decreases, the voltage at the power terminal VCC is greater than the voltage of point b, and the second diode D2 is turned on. Then, the power terminal VCC charges the second capacitor C21, and the voltage of the second capacitor C21 gradually rises. Correspondingly, the voltage at point b gradually rises, and the second diode D2 is turned off, then the power terminal VCC stops charging the second capacitor C21. As such, the voltage of the second capacitor C21 is equal to the voltage of the power terminal VCC. Moreover, when the second capacitor C21 is discharged to trigger the second field-effect transistor Q2 to be turned on, the voltage at point b is greater than the voltage at the power terminal VCC. By means of the second diode, the voltage of the second capacitor C21 may be prevented from being output to the power terminal VCC, which ensures the safety of the circuit and prevents unnecessary loss of the electric energy of the second capacitor C21.

In the embodiment of the present disclosure, the second capacitor C21 can provide the driving voltage to the second switch 212, so that the second switch 212 is kept in the on-state most of the time in the buck mode, and has a very high conduction ratio. Moreover, since all the four switches in the voltage conversion module 210 are constantly switched between the on-state and the off-state, after the fourth switch 214 is turned on, the second capacitor C21 can be charged, which ensures that the second capacitor C21, as the bootstrap capacitor, can operate normally.

The second driving circuit 240 is the same as the first driving circuit 230, which greatly simplifies the design of the driving circuit, and reduces the complexity and cost of the circuit, while ensuring that the efficiency of the product is substantially unaffected.

It is notable that the fifth switch Q11 may also be the N-type MOS transistor, and the sixth switch Q12 may be the P-type MOS transistor. In this case, when the first pulse signal sent by the control module 220 is the high level signal, the fifth switch Q11 is turned on, and the sixth switch Q12 is turned off, which triggers the first field-effect transistor Q1 to be turned on. Similarly, the seventh switch Q21 may further be the N-type MOS transistor, and the eighth switch Q22 may be the P-type MOS transistor. In this case, when the first pulse signal sent by the control module 220 is the high level signal, the seventh switch Q21 is turned on, and the eighth switch Q22 is turned off, which triggers the second field-effect transistor Q2 to be turned on. The level signal, which is capable of triggering the fifth switch Q11 and the seventh switch Q21 to be turned on, is the first level signal, and the time ratio of the first level signal in each pulse period may be high, such as 90%, 91%, etc., thereby ensuring that the switches in the upper half of the bridge arm are almost turned on all the time.

In some implementations, the fifth switch Q11, the sixth switch Q12, the seventh switch Q21, the eighth switch Q22, etc. may further be other switch tubes, such as triodes, and they are not limited to MOS transistors.

Figure 5:
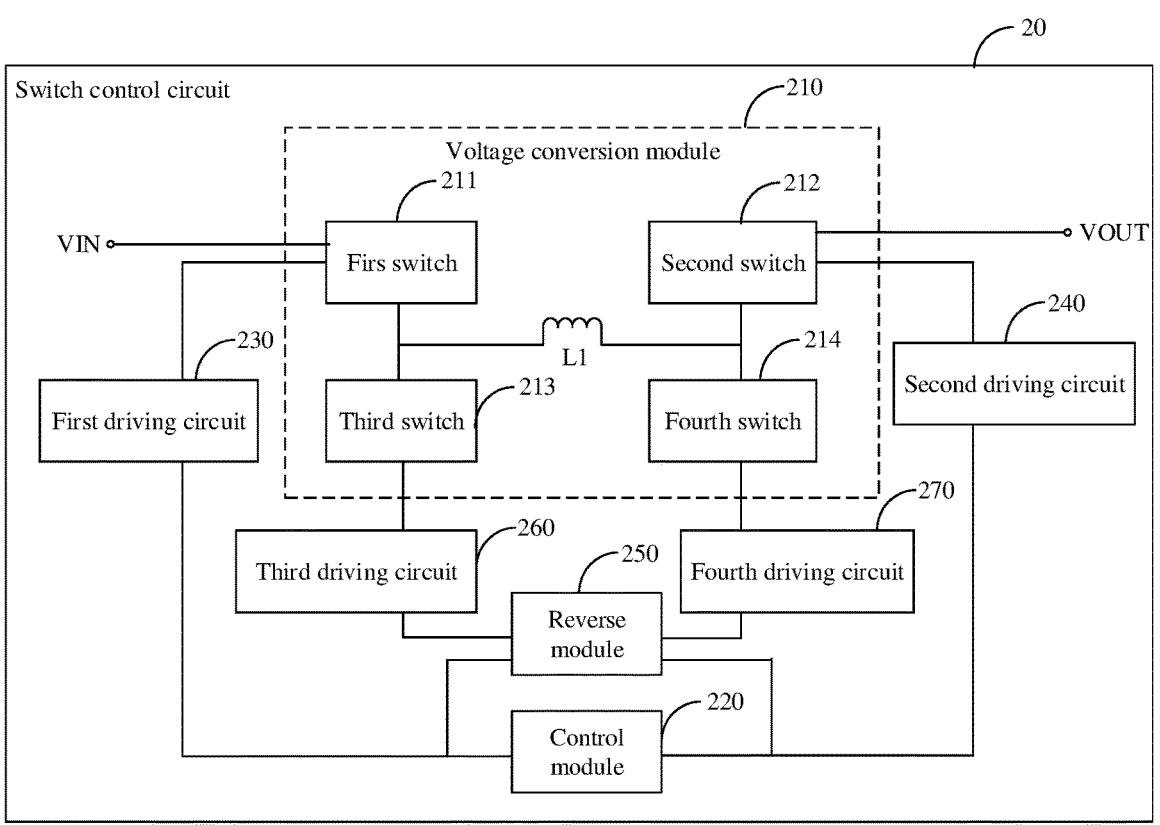
FIG. 5 is a schematic structural block diagram of a switch control circuit according to another embodiment.

As illustrated in FIG. 5, in an embodiment, the switch control circuit 20 further includes a reverse module 250, a third driving circuit 260, and a fourth driving circuit 270, in addition the voltage conversion module 210, the control module 220, the first driving circuit 230 and the second driving circuit 240. The third driving circuit 260 is connected with the third switch 213, and the fourth driving circuit 270 is connected with the fourth switch 270. The reverse module 250 may be connected to each of the control module 220, the third driving circuit 260 and the fourth driving circuit 270.

The reverse module 250 is further configured to reverse the first pulse signal output by the control module 220, to obtain a second pulse signal. If the determined operating mode is the boost mode, the second pulse signal is sent to the third driving circuit 260. If the determined operating mode is the buck mode, the second pulse signal is sent to the fourth driving circuit 270.

The third driving circuit 260 is configured to drive the third switch 213 to be kept in the on-state when the received second pulse signal is the first level signal.

The fourth driving circuit 270 is configured to drive the fourth switch 214 to be kept in the on-state when the received second pulse signal is the first level signal.

The reverse module 250 may reverse the pulse signal output by the control module 220 to the first switch 211, and output the reverse pulse signal to the third switch 213. Further, the reverse module may reverse the pulse signal output by the control module 220 to the second switch 212, and output the reverse pulse signal to the fourth switch 214. By using the reverse module 250, it may be ensured that the pulse signals received simultaneously by the two switches in a same bridge arm are pulse signals reversed to each other, and the two switches on the same bridge arm may not be turned on or turned off at the same time.

For example, in the boost mode, the control module 220 outputs, to the first driving circuit 230, the first pulse signal whose pulse frequency is equal to the first switching frequency, and the first pulse signal may be simultaneously input to the reverse module 250. After a reverse operation by the reverse module 250, the second pulse signal whose pulse frequency is equal to the first switching frequency may be obtained, and the second pulse signal is input to the third driving circuit 260. The second pulse signal and the first pulse signal are reversed to each other. Meanwhile, in the boost mode, the control module 220 outputs, to the second driving circuit 240, a third pulse signal whose pulse frequency is equal to the second switching frequency, and the third pulse signal may be simultaneously input to the reverse module 250. After the reverse operation by the reverse module 250, a fourth pulse signal whose pulse frequency is equal to the second switching frequency may be obtained, and the fourth pulse signal is input to the fourth driving circuit 270. The third pulse signal and the fourth pulse signal are reversed to each other. Thus, it is ensured that the second switch 212 and the fourth switch 214 are switched, in the boost mode, between the on-state and the off-state at the second switching frequency.

For another example, in the buck mode, the control module 220 outputs, to the second driving circuit 240, the first pulse signal whose pulse frequency is equal to the first switching frequency, and the first pulse signal may be simultaneously input to the reverse module 250. After the reverse operation by the reverse module 250, the second pulse signal whose pulse frequency is equal to the first switching frequency may be obtained, and the second pulse signal is input to the fourth driving circuit 270. Meanwhile, in the buck mode, the control module 220 outputs, to the first driving circuit 230, the third pulse signal whose pulse frequency is equal to the second switching frequency, and the third pulse signal may be simultaneously input to the reverse module 250. After the reverse operation by the reverse module 250, the fourth pulse signal whose pulse frequency is equal to the second switching frequency may be obtained, and the fourth pulse signal is input to the third driving circuit 260. Thus, it is ensured that the first switch

211 and the third switch 213 are switched, in the buck mode, between the on-state and the off-state at the second switching frequency.

In some implementations, the third driving circuit 260 and the fourth driving circuit 260 above may be push-pull output driving circuits, and each of the third driving circuit 260 and the fourth driving circuit 260 may include a pair of symmetrical switch tubes (for the specific circuit structure thereof, reference may be made to the fifth switch Q11 and the sixth switch Q12 in FIG. 4B). Only one of the symmetrical switch tubes is turned on at a time, so as to offer push-pull driving and improve the switching speed. Different from the first driving circuit 230 and the second driving circuit 240, the third switch 213 and the fourth switch 214 do not need to be kept in the normally on state, so there is no need for the bootstrap capacitor to provide power to drive the third switch 213 and the fourth switch 214 to be kept in the on-state for a long time.

It is notable that the reverse module 250 may further be integrated in the control module 220. The control module 220 may first perform the reverse operation on a to-be-output pulse signal internally, and then output two pulse signals reversed to each other, ensuring that the two switches in the same bridge arm may receive signals with different levels at the same time.

In an embodiment, the control module 220 is further configured to obtain a voltage comparison result between the input voltage and the output voltage of the voltage conversion module 210, and control, according to the voltage comparison result, the voltage conversion module 210 to operate in at least one of the boost mode, the buck mode and the buck-boost mode.

Figure 6:
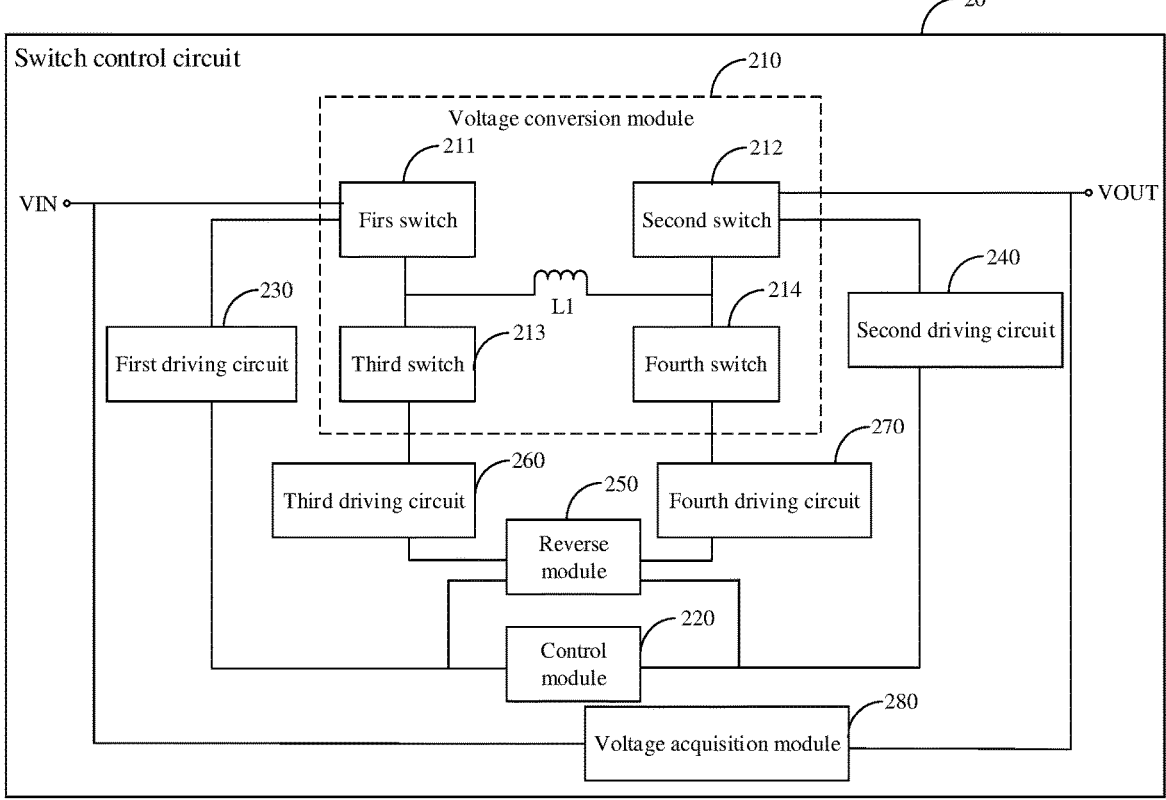
FIG. 6 is a schematic structural block diagram of a switch control circuit according to another embodiment.

As illustrated in FIG. 6, in an embodiment, the switch control circuit 20 may further include a voltage acquisition module 280, and the voltage acquisition module 280 may be connected with each of the input terminal VIN of the voltage conversion module 210 and the output terminal VOUT of the voltage conversion module 210. An output terminal of the voltage acquisition module 280 may be connected with an input terminal of the control module 220.

The voltage acquisition module 280 may be configured to acquire the input voltage input at the input terminal of the voltage conversion module 210, and the output voltage output by the output terminal of the voltage conversion module 210, and compare the input voltage with the output voltage to obtain the voltage comparison result. After obtaining the voltage comparison result, the voltage acquisition module 280 may send the voltage comparison result to the control module 220.

The control module 220 is further configured to: control the voltage conversion module 210 to operate in the boost mode, if the voltage comparison result shows that the input voltage is less than the output voltage and the absolute difference between the output voltage and the input voltage is greater than a first threshold; and control the voltage conversion module 210 to operate in the buck mode, if the voltage comparison result shows that the input voltage is greater than the output voltage and the absolute difference between the input voltage and the output voltage is greater than a second threshold.

The first threshold and second threshold may be set according to actual needs, which are not limited herein. For example, the first threshold is 5V, and the second threshold is 10V; alternatively, both the first threshold and the second threshold are 23V.

The control module 220 is further configured to, if the voltage comparison result shows that the absolute difference between the input voltage and the output voltage is less than a third threshold, control all of the first switch 211, the second switch 212, the third switch 213 and the fourth switch 214 to switch, at the first switching frequency, between the on-state and the off-state, so that the voltage conversion module 210 operates in the buck-boost mode. If the voltage comparison result shows that the absolute difference between the input voltage and the output voltage is less than the third threshold, it means that the input voltage and the output voltage are close to each other, and the voltage conversion module 210 may be controlled to operate in the buck-boost mode, in which all the four switches of the voltage conversion module 210 may operate at the low first switching frequency, thereby reducing the switching loss of the circuit and improving the product efficiency.

As a specific implementation, the first threshold, second threshold and third threshold may be a same voltage value, and the specific values thereof are not limited in the embodiments of the present disclosure.

In the embodiments of the present disclosure, the control module 220 may switch, according to the voltage comparison result, the operating mode of the voltage conversion module 210. And in each of the operating modes, the four switches are constantly switched between the on-state and the off-state. As such, the control module only needs to control the switching frequency of each switch. In this way, the control over each switch is simplified, the circuit design is simplified, the cost is reduced, the switching loss of the circuit is reduced, and the product performance is improved.

Figure 7A:
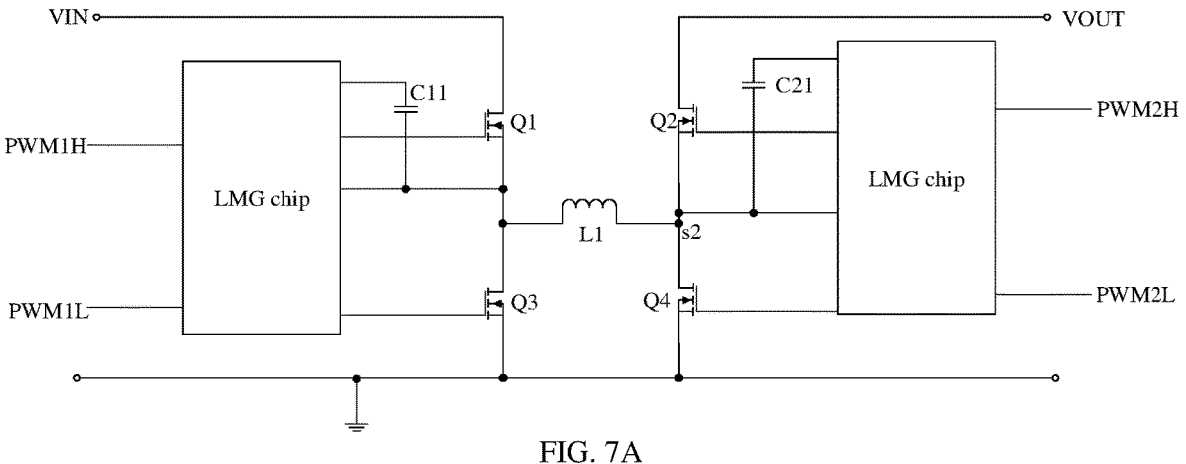
FIG. 7A is a schematic diagram of a switch control circuit according to another embodiment.

FIG. 7A is a schematic diagram of the switch control circuit according to another embodiment. As illustrated in FIG. 7, the switch control circuit 20 may include two LMG chips, and each LMG chip may include an upper driving tube and a lower driving tube which are connected to a respective bridge arm. Taking the first field-effect transistor Q1 and the third field-effect transistor Q3 as an example, the LMG chip connected with them may include the fifth switch Q11, the sixth switch Q12, the third driving circuit 260, and the first diode D1 mentioned above, etc. Two pulse signals PWM1H and PWM2H which are reversed to each other may be input to the LMG chip, and then output, after passing through the LMG chip, to the first field-effect transistor Q1 and the third field-effect transistor Q3 respectively, so as to control the first field-effect transistor Q1 and the third field-effect transistor Q3 to be on or off. In some implementations, the LMG chip may further be replaced with other driver chips, which is not limited here.

Figure 7B:
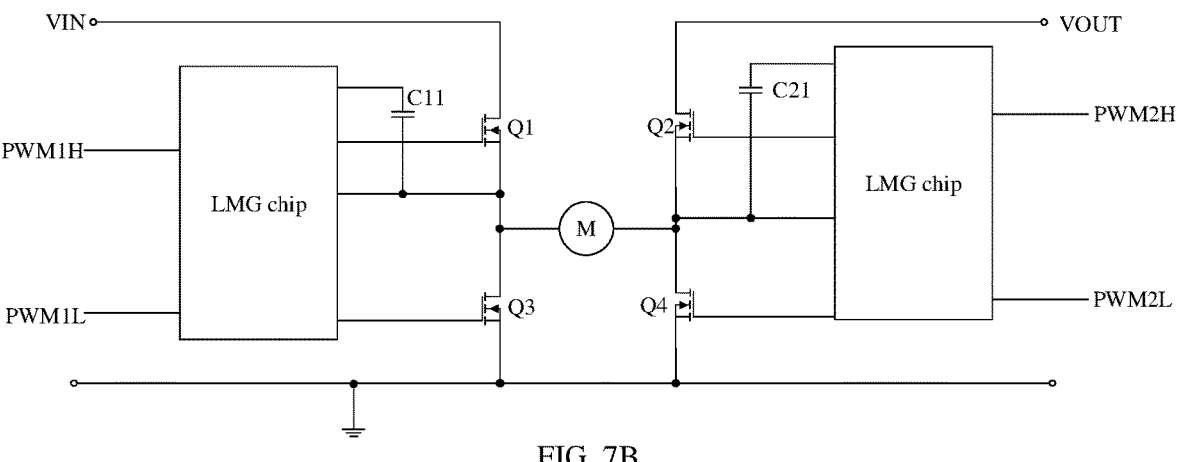
FIG. 7B is a schematic diagram of a switch control circuit according to another embodiment.

It is notable that the switch control circuit 20 provided in the embodiments of the present disclosure may be applied not only to the Buck-Boost circuit, but also to other functional circuits, such as DC motor H-bridge driver and BLDC motor driver, which need to make the upper transistor in the arm of the half bridge be normally on. FIG. 7B is a schematic diagram of the switch control circuit according to another embodiment. As illustrated in FIG. 7B, the bootstrap capacitor C11 and the bootstrap capacitor C21 may provide driving voltages respectively for the upper switch tube Q1 of the left bridge arm and the upper switch tube Q2 of the right bridge arm, so that Q1 and Q2 can be kept in the on-state for a long time. This simplifies the driving circuit, and reduces the cost.

In an embodiment, an electronic device is provided, which may include the switch control circuit 20 described in the above embodiments. In some embodiments, the electronic device may include, but is not limited to, a power adapter, a motor product, etc., which is not limited here.

As illustrated in FIG. 8, in an embodiment, a switch control method is provided. The method may be applied to the above electronic device, and may include the following operations.

At block 810, a voltage conversion module performs a conversion on a received input voltage to obtain an output voltage.

The voltage conversion module includes a first switch, a second switch, a third switch and a fourth switch, the first switch and the third switch constitute a first bridge arm, and the second switch and the fourth switch constitute a second bridge arm. The voltage conversion module operates, based on the input voltage, in at least one of the boost mode, the buck mode, and the buck-boost mode.

At block 820, the first switch and the third switch are controlled to switch, at a first switching frequency, between an on-state and an off-state, and the second switch and the fourth switch are controlled to switch, at a second switching frequency, between the on-state and the off-state, so as to control the voltage conversion module to operate in the boost mode and perform a boost conversion on the input voltage.

At block 830, the first switch and the third switch are controlled to switch, at the second switching frequency, between the on-state and the off-state, and the second switch and the fourth switch are controlled to switch, at the first switching frequency, between the on-state and the off-state, so as to control the voltage conversion module to operate in the buck mode and perform a buck conversion on the input voltage.

The first switching frequency is less than the second switching frequency. It is notable that there is no restriction on the execution time sequence between block 820 and block 830. Block 820 may be executed first, or block 830 may be executed first, depending on the required operating mode of the voltage conversion module.

In the embodiments of the present disclosure, no matter in the boost mode or the buck mode, the four switches of the voltage conversion module 210 are constantly switched between the on-state and the off-state. Only the switching frequency of each switch needs to be controlled, which simplifies the control over each switch, and there is no need to design an independent driving circuit or control circuit to keep the first switch or the second switch being in the on-state. Thus, the switch control circuit is simplified, and the circuit cost is reduced.

In an embodiment, when the first switch is in the on-state, the third switch is in the off-state. When the first switch is in the off-state, the third switch is in the on-state. In the boost mode, the on-time during which the first switch is in the on-state is longer than the off-time during which the first switch 211 is in the off-state.

When the second switch is in the on-state, the fourth switch is in the off-state. When the second switch is in the off-state, the fourth switch is in the on-state. In the buck mode, the on-time during which the second switch in the on-state is longer than the off-time during which the second switch in the off-state.

In an embodiment, the operation of controlling the first switch and the third switch to switch, at the first switching frequency, between the on-state and the off-state may include: sending, according to the first switch frequency, a first pulse signal to a first driving circuit, so that the first driving circuit provides a driving voltage to the first switch so as to drive the first switch to keep being in the on-state, when the first pulse signal is a first level signal.

The operation of controlling the second switch and the fourth switch to switch, at the first switching frequency, between the on-state and the off-state includes: sending, according to the first switch frequency, the first pulse signal to a second driving circuit, so that the second driving circuit provides the driving voltage to the second switch so as to drive the second switch to keep being in the on-state, when the first pulse signal is the first level signal.

In the first pulse signal, the time ratio of the first level signal in each pulse period is greater than the time ratio of the second level signal in the pulse period, and the second level signal is configured to trigger the first switch or the second switch to be in the off-state.

In an embodiment, the first driving circuit includes a first capacitor.

The operating of sending, according to the first switch frequency, the first pulse signal to the first driving circuit, so that the first driving circuit provides the driving voltage to the first switch so as to drive the first switch to keep being in the on-state when the first pulse signal is the first level signal, includes: sending, according to the first switching frequency, the first pulse signal to the first driving circuit, so that the first driving circuit provides the driving voltage to the first switch through the first capacitor, so as to drive the first switch to keep being in the on-state, when the first pulse signal is the first level signal.

In an embodiment, the method above further includes: charging the first capacitor through the voltage provided at the power terminal, when the first pulse signal received by the first driving circuit is the second level signal.

In an embodiment, the second driving circuit includes a second capacitor.

The operation of sending, according to the first switching frequency, the first pulse signal to the second driving circuit, so that the second driving circuit provides the driving voltage to the second switch so as to drive the second switch to keep being in the on-state when the first pulse signal is the first level signal, includes: sending, according to the first switching frequency, the first pulse signal to the second driving circuit, so that the second driving circuit provides the driving voltage to the second switch through the second capacitor, so as to drive the second switch to keep being in the on-state, when the first pulse signal is the first level signal.

In an embodiment, the method further includes: charging the second capacitor through the voltage provided at the power terminal, when the first pulse signal received by the second driving circuit is the second level signal.

In the embodiments of the present disclosure, the bootstrap capacitors are utilized to provide the driving voltage for the respective switches, which ensures that the switches are in the on-state most of the time, and have a very high on ratio. Also, because the four switches in the voltage conversion module are constantly switched between the on-state and the off-state, the bootstrap capacitors can be charged so as to operate normally.

In an embodiment, the method further includes: obtaining a voltage comparison result between an input voltage and an output voltage of the voltage conversion module, and controlling, according to the voltage comparison result, the voltage conversion module to operate in at least one of the boost mode, the buck mode and the buck-boost mode.

In an embodiment, the operation of controlling, according to the voltage comparison result, the voltage conversion module to operate in at least one of the boost mode, the buck mode and the buck-boost mode includes: controlling the voltage conversion module to operate in the boost mode, when the voltage comparison result shows that the input voltage is less than the output voltage and the absolute difference between the output voltage and the input voltage is greater than a first threshold; and controlling the voltage conversion module to operate in the buck mode, when the voltage comparison result shows that the input voltage is greater than the output voltage and the absolute difference between the input voltage and the output voltage is greater than a second threshold.

In an embodiment, the operation of controlling, according to the voltage comparison result, the voltage conversion module to operate in at least one of the boost mode, the buck mode and the buck-boost mode further includes: when the voltage comparison result shows that the absolute difference between the input voltage and the output voltage is less than the third threshold, controlling all the first switch, the second switch, the third switch and the fourth switch to switch, at the first switching frequency, between the on-state and the off-state, so as to control the voltage conversion module to operate in the buck-boost mode.

In the embodiments of the present disclosure, the operating modes of the voltage conversion module may be switched according to the voltage comparison result. And in each of the operating modes, the four switches are constantly switched between the on-state and the off-state. As such, the control module only needs to control the switching frequency of each switch. In this way, the control over each switch is simplified, the circuit design is simplified, the cost is reduced, the switching loss of the circuit is reduced, and the product performance is improved.

As illustrated in FIG. 9, in an embodiment, an electronic device 900 is provided, which includes a processor 910 and a memory 920. A computer program is stored in the memory 920. The computer program, when being executed by the processor 910, causes the processor 910 to implement the method described in the above embodiments.

The embodiments of the present disclosure provide a computer-readable storage medium, which stores a computer program. The computer program, when being executed by the processor, causes the method described in the above embodiments to be implemented.

The embodiments of the present disclosure provide a computer program product. The computer program product includes a non-transitory computer-readable storage medium storing a computer program. The computer program may be executed by the processor to implement the method described in the above embodiments.

It may be understandable for those of ordinary skilled in the art that, all or part of the processes in the method of the above embodiments may be implemented by instructing related hardware through the computer program, and the program may be stored in a non-volatile computer-readable storage medium. When being executed, the program may implement the processes of the above embodiments. The storage medium may be a magnetic disk, an optical disk, a Read-Only Memory (ROM), etc.

As used herein, any referenced memory, storage, database or other media may include a non-volatile and/or volatile memory. A suitable non-volatile memory may include ROM, programmable ROM (PROM), erasable PROM (EPROM), electrically erasable PROM (EEPROM) or flash memory. The volatile memory may include a random access memory (RAM), which is used as an external cache memory. By way of illustration and not limitation, RAM is available in various forms, such as static RAM (SRAM), dynamic RAM (DRAM), synchronous DRAM (SDRAM), double data rate SDRAM (DDR SDRAM), enhanced synchronous DRAM (ESDRAM), synchlink DRAM (SLDRAM), rambus DRAM (RDRAM) and direct rambus DRAM (DRDRAM).

The technical features of the embodiments above may be combined arbitrarily. In order to make the description concise, not all possible combinations of the technical features in the embodiments above are described. However, as long as there is no contradiction in the combinations of these technical features, they should be considered as falling within the scope of the specification.

Only several implementations are described in the embodiments of the present disclosure, and the descriptions are specific and detailed, but they cannot be construed as limiting the scope of present disclosure. It is notable that, for those skilled in the art, several modifications and improvements may be made without departing from the concept of the present disclosure, which are within the protection scope of the present disclosure. Therefore, the scope of the protection of the present disclosure shall be subject to the appended claims.

What is claimed is:

1. A switch control circuit, comprising:

a voltage conversion module, comprising a first switch, a second switch, a third switch, and a fourth switch, wherein the first switch and the third switch constitute a first bridge arm, the second switch and the fourth switch constitute a second bridge arm, and the voltage conversion module is configured to receive an input voltage, and operate, based on the input voltage, in at least one of a boost mode, a buck mode and a buck-boost mode;

a control module, wherein the control module is configured to control the first switch and the third switch to switch, at a first switching frequency, between an on-state and an off-state, and control the second switch and the fourth switch to switch, at a second switching frequency, between the on-state and the off-state, so as to control the voltage conversion module to operate in the boost mode and perform a boost conversion on the input voltage; and the control module is further configured to control the first switch and the third switch to switch, at the second switching frequency, between the on-state and the off-state, and control the second switch and the fourth switch to switch, at the first switching frequency, between the on-state and the off-state, so as to control the voltage conversion module to operate in the buck mode and perform a buck conversion on the input voltage, the first switching frequency being less than the second switching frequency;

wherein the first switch is connected with an input terminal of the voltage conversion module, and the second switch is connected with an output terminal of the voltage conversion module; when the second switch is in the on-state, the fourth switch is in the off-state; when the second switch is in the off-state, the fourth switch is in the on-state; and in the buck mode, an on-time during which the second switch is in the on-state is longer than an off-time during which the second switch is in the off-state;

wherein the switch control circuit further comprises a driving circuit connected with the second switch; the control module is further configured to send, according to the first switching frequency, a first pulse signal to the driving circuit, when the voltage conversion module operates in the buck mode, wherein a pulse frequency of the first pulse signal is equal to the first switching frequency; and the driving circuit is configured to, when the received first pulse signal is a first level signal, provide a driving voltage to the second switch so as to drive the second switch to keep being in the on-state; and wherein the driving circuit comprises a first driving circuit switch, a second driving circuit switch and a capacitor, and each of the first driving circuit switch and the second driving circuit switch is connected with the control module; a first terminal of the capacitor is connected with the second switch through the first driving circuit switch, and a second terminal of the capacitor is connected with the second driving circuit switch; the first driving circuit switch is configured to be in the on-state when the first pulse signal sent by the control module is the first level signal, and be in the off-state when the first pulse signal sent by the control module is a second level signal; the second driving circuit switch is configured to be in the on-state when the first pulse signal sent by the control module is the second level signal, and be in the off-state when the first pulse signal sent by the control module is the first level signal; and the capacitor is configured to, when the first driving circuit switch is in the on-state, provide a driving voltage to the second switch so as to drive the second switch to be in the on-state; wherein in the first pulse signal, a time ratio of the first level signal in each pulse period is greater than a time ratio of the second level signal in the pulse period.

2. The switch control circuit of claim 1, wherein when the first switch is in the on-state, the third switch is in the off-state; when the first switch is in the off-state, the third switch is in the on-state; and in the boost mode, an on-time during which the first switch is in the on-state is longer than an off-time during which the first switch is in the off-state.

3. The switch control circuit of claim 2, wherein the switch control circuit further comprises a further driving circuit, and the further driving circuit is connected with the first switch the control module is further configured to: send, according to the first switching frequency, the first pulse signal to the further driving circuit, when the voltage conversion module operates in the boost mode; and the further driving circuit is configured to, when the received first pulse signal is the first level signal, provide a driving voltage to the first switch so as to drive the first switch to keep being in the on-state.

4. The switch control circuit of claim 3, wherein the first further driving circuit comprises a third driving circuit switch, a fourth driving circuit switch and a further capacitor, and each of the third driving circuit switch and the fourth driving circuit switch is connected with the control module; a first terminal of the further capacitor is connected with the first switch through the third driving circuit switch, and a second terminal of the further capacitor is connected with the fourth driving circuit switch;

the third driving circuit switch is configured to be in the on-state when the first pulse signal sent by the control module is the first level signal, and be in the off-state when the first pulse signal sent by the control module is the second level signal;

the fourth driving circuit switch is configured to be in the on-state when the first pulse signal sent by the control module is the second level signal, and be in the off-state when the first pulse signal sent by the control module is the first level signal; and the further capacitor is configured to, when the third driving circuit switch is in the on-state, provide the driving voltage to the first switch so as to drive the first switch to be in the on-state;

wherein in the first pulse signal, a time ratio of the first level signal in each pulse period is greater than a time ratio of the second level signal in the pulse period.

5. The switch control circuit of claim 4, wherein the first switch comprises an N-type first field-effect transistor, a drain of the first field-effect transistor is connected with the input terminal; a gate of the first field-effect transistor is connected with the first terminal of the further capacitor through the third driving circuit switch; and a source of the first field-effect transistor is connected with each of the third switch, the fourth driving circuit switch and the second terminal of the further capacitor.

6. The switch control circuit of claim 4, wherein the first terminal of the further capacitor is further connected with a power terminal, and the second terminal of the further capacitor is further connected with the third switch, and the third switch is grounded;

the further capacitor is further configured to be charged based on a voltage provided by the power terminal, when the third driving circuit switch is in the off-state and the third switch is in the on-state.

7. The switch control circuit of claim 6, wherein the first driving circuit further comprises a first diode, the first terminal of the further capacitor is connected with a negative pole of the first diode, and a positive pole of the first diode is connected with the power terminal; and when the third switch is in the on-state, the power terminal is configured to charge the further capacitor through the first diode.

8. The switch control circuit of claim 3, wherein the switch control circuit further comprises a reverse module, a third driving circuit and a fourth driving circuit, the third driving circuit is connected with the third switch, and the fourth driving circuit is connected with the fourth switch; the reverse module is connected with each of the control module, the third driving circuit and the fourth driving circuit;

the reverse module is further configured to: reverse the first pulse signal output by the control module, so as to obtain a second pulse signal; send the second pulse signal to the third driving circuit, when a determined operating mode is the boost mode; and send the second pulse signal to the fourth driving circuit, when the determined operating mode is the buck mode;

the third driving circuit is configured to, when the received second pulse signal is the first level signal, drive the third switch to keep being in the on-state; and the fourth driving circuit is configured to, when the received second pulse signal is the first level signal, drive the fourth switch to keep being in the on-state.

9. The switch control circuit of claim 1, wherein the second switch comprises an N-type second field-effect transistor, a drain of the second field-effect transistor is connected with the output terminal; a gate of the second field-effect transistor is connected with the first terminal of the capacitor through the first driving circuit switch; and a source of the second field-effect transistor is connected with each of the fourth switch, the second driving circuit switch and the second terminal of the capacitor.

10. The switch control circuit of claim 1, wherein the control module is further configured to: obtain a voltage comparison result between the input voltage and an output voltage of the voltage conversion module; and control, according to the voltage comparison result, the voltage conversion module to operate in the at least one of the boost mode, the buck mode, and the boost-buck mode.

11. The switch control circuit of claim 10, wherein the control module is further configured to: control the voltage conversion module to operate in the boost mode, when the voltage comparison result shows that the input voltage is less than the output voltage and an absolute difference between the output voltage and the input voltage is greater than a first threshold; and control the voltage conversion module to operate in the buck mode, when the voltage comparison result shows that the input voltage is greater than the output voltage and the absolute difference between the input voltage and the output voltage is greater than a second threshold.

12. The switch control circuit of claim 10, wherein the control module is further configured to, when the voltage comparison result shows that an absolute difference between the input voltage and the output voltage is less than a third threshold, control each of the first switch, the second switch, the third switch, and the fourth switch to switch, at the first switching frequency, between the on-state and the off-state, so as to control the voltage conversion module to operate in the buck-boost mode.

13. An electronic device, comprising a control switch circuit, wherein the control switch circuit comprises:

a voltage conversion module, comprising a first switch, a second switch, a third switch, and a fourth switch, wherein the first switch and the third switch constitute a first bridge arm, the second switch and the fourth switch constitute a second bridge arm, and the voltage conversion module is configured to receive an input voltage, and operate, based on the input voltage, in at least one of a boost mode, a buck mode and a buck-boost mode;

a control module, wherein the control module is configured to control the first switch and the third switch to switch, at a first switching frequency, between an on-state and an off-state, and control the second switch and the fourth switch to switch, at a second switching frequency, between the on-state and the off-state, so as to control the voltage conversion module to operate in the boost mode and perform a boost conversion on the input voltage; and the control module is further configured to control the first switch and the third switch to switch, at the second switching frequency, between the on-state and the off-state, and control the second switch and the fourth switch to switch, at the first switching frequency, between the on-state and the off-state, so as to control the voltage conversion module to operate in the buck mode and perform a buck conversion on the input voltage, the first switching frequency being less than the second switching frequency;

wherein the switch control circuit further comprises a first driving circuit connected with the first switch and a second driving circuit connected with the second switch; the control module is further configured to: send, according to the first switching frequency, a first pulse signal to the first driving circuit, when the voltage conversion module operates in the boost mode; and send, according to the first switching frequency, the first pulse signal to the second driving circuit, when the voltage conversion module operates in the buck mode, wherein a pulse frequency of the first pulse signal is equal to the first switching frequency; the first driving circuit is configured to, when the received first pulse signal is a first level signal, provide a driving voltage to the first switch so as to drive the first switch to keep being in the on-state; and the second driving circuit is configured to, when the received first pulse signal is the first level signal, provide a driving voltage to the second switch so as to drive the second switch to keep being in the on-state; and wherein the switch control circuit further comprises a reverse module, a third driving circuit and a fourth driving circuit, the third driving circuit is connected with the third switch, and the fourth driving circuit is connected with the fourth switch; the reverse module is connected with each of the control module, the third driving circuit and the fourth driving circuit; the reverse module is further configured to: reverse the first pulse signal output by the control module, so as to obtain a second pulse signal; send the second pulse signal to the third driving circuit, when a determined operating mode is the boost mode; and send the second pulse signal to the fourth driving circuit, when the determined operating mode is the buck mode; the third driving circuit is configured to, when the received second pulse signal is the first level signal, drive the third switch to keep being in the on-state; and the fourth driving circuit is configured to, when the received second pulse signal is the first level signal, drive the fourth switch to keep being in the on-state.

14. The electronic device of claim 13, wherein the first switch is connected with an input terminal of the voltage conversion module, and the second switch is connected with an output terminal of the voltage conversion module;

when the first switch is in the on-state, the third switch is in the off-state; when the first switch is in the off-state, the third switch is in the on-state; and in the boost mode, an on-time during which the first switch is in the on-state is longer than an off-time during which the first switch is in the off-state;

when the second switch is in the on-state, the fourth switch is in the off-state; when the second switch is in the off-state, the fourth switch is in the on-state; and in the buck mode, an on-time during which the second switch is in the on-state is longer than an off-time during which the second switch is in the off-state.

15. The electronic device of claim 14, wherein the control module is further configured to: obtain a voltage comparison result between the input voltage and an output voltage of the voltage conversion module; and control, according to the voltage comparison result, the voltage conversion module to operate in the at least one of the boost mode, the buck mode, and the boost-buck mode.

16. The electronic device as claimed in claim 14, wherein the first driving circuit comprises a fifth switch, a sixth switch and a first capacitor, and each of the fifth switch and the sixth switch is connected with the control module; a first terminal of the first capacitor is connected with the first switch through the fifth switch, and a second terminal of the first capacitor is connected with the sixth switch;

the fifth switch is configured to be in the on-state when the first pulse signal sent by the control module is the first level signal, and be in the off-state when the first pulse signal sent by the control module is a second level signal;

the sixth switch is configured to be in the on-state when the first pulse signal sent by the control module is the second level signal, and be in the off-state when the first pulse signal sent by the control module is the first level signal; and the first capacitor is configured to, when the fifth switch is in the on-state, provide the driving voltage to the first switch so as to drive the first switch to be in the on-state;

wherein in the first pulse signal, a time ratio of the first level signal in each pulse period is greater than a time ratio of the second level signal in the pulse period.

17. The electronic device as claimed in claim 14, wherein the second driving circuit comprises a seventh switch, an eighth switch and a second capacitor, and each of the seventh switch and the eighth switch is connected with the control module; a first terminal of the second capacitor is connected with the second switch through the seventh switch, and a second terminal of the second capacitor is connected with the eighth switch;

the seventh switch is configured to be in the on-state when the first pulse signal sent by the control module is the first level signal, and be in the off-state when the first pulse signal sent by the control module is a second level signal;

the eighth switch is configured to be in the on-state when the first pulse signal sent by the control module is the second level signal, and be in the off-state when the first pulse signal sent by the control module is the first level signal; and the second capacitor is configured to, when the seventh switch is in the on-state, provide a driving voltage to the second switch so as to drive the second switch to be in the on-state;

wherein in the first pulse signal, a time ratio of the first level signal in each pulse period is greater than a time ratio of the second level signal in the pulse period.

18. A switch control method, comprising:

converting, by a voltage conversion module, a received input voltage to obtain an output voltage, wherein the voltage conversion module comprises a first switch, a second switch, a third switch, and a fourth switch, the first switch and the third switch constitute a first bridge arm, the second switch and the fourth switch constitute a second bridge arm, and the voltage conversion module is configured to operate, based on the input voltage, in at least one of a boost mode, a buck mode and a buck-boost mode;

controlling the first switch and the third switch to switch, at a first switching frequency, between an on-state and an off-state, and controlling the second switch and the fourth switch to switch, at a second switching frequency, between the on-state and the off-state, so as to control the voltage conversion module to operate in the boost mode and perform a boost conversion on the input voltage;

controlling the first switch and the third switch to switch, at the second switching frequency, between the on-state and the off-state, and controlling the second switch and the fourth switch to switch, at the first switching frequency, between the on-state and the off-state, so as to control the voltage conversion module to operate in the buck mode and perform a buck conversion on the input voltage, the first switching frequency being less than the second switching frequency;

wherein the first switch is connected with an input terminal of the voltage conversion module; when the first switch is in the on-state, the third switch is in the off-state; when the first switch is in the off-state, the third switch is in the on-state; and in the boost mode, an on-time during which the first switch is in the on-state is longer than an off-time during which the first switch is in the off-state; and wherein controlling the first switch and the third switch to switch, at the first switching frequency, between the on-state and the off-state, comprises:

sending, according to the first switching frequency, a first pulse signal to a first driving circuit, wherein a pulse frequency of the first pulse signal is equal to the first switching frequency, the first driving circuit is connected with the first switch, the first driving circuit comprises a fifth switch, a sixth switch and a first capacitor, a first terminal of the first capacitor is connected with the first switch through the fifth switch, and a second terminal of the first capacitor is connected with the sixth switch;

controlling the fifth switch to be in the on-state when the first pulse signal is a first level signal, and controlling the fifth switch to be in the off-state when the first pulse signal is a second level signal;

controlling the sixth switch to be in the on-state when the first pulse signal is the second level signal, and controlling the sixth switch to be in the off-state when the first pulse signal is the first level signal, wherein in the first pulse signal, a time ratio of the first level signal in each pulse period is greater than a time ratio of the second level signal in the pulse period; and controlling the first capacitor to provide a driving voltage to the first switch so as to drive the first switch to be in the on-state, when the fifth switch is in the on-state.

19. The method of claim 18, wherein the second switch is connected with an output terminal of the voltage conversion module; and when the second switch is in the on-state, the fourth switch is in the off-state; when the second switch is in the off-state, the fourth switch is in the on-state; and in the buck mode, an on-time during which the second switch is the on-state is longer than an off-time during which the second switch is in the off-state.

20. The method of claim 19, wherein controlling the second switch and the fourth switch to switch, at the first switching frequency, between the on-state and the off-state, comprises:

sending, according to the first switching frequency, the first pulse signal to a second driving circuit, so that the second driving circuit provides, in response to the first pulse signal being the first level signal, a driving voltage to the second switch so as to drive the second switch to keep being in the on-state;

wherein than a time ratio of a second level signal in the pulse period, the second level signal being configured to trigger the first switch or the second switch to be in the off-state.

* * * * *